US012735586B2

(12) United States Patent
Watanabe

(10) Patent No.: US 12,735,586 B2
(45) Date of Patent: Sep. 15, 2026

(54) INK COMPOSITION FOR AN INKJET, A RECORDED MATERIAL, AND A RECORDING METHOD WITH AN INKJET

(71) Applicant: Nissin Chemical Industry Co., Ltd., Echizen (JP)

(72) Inventor: Kentaro Watanabe, Echizen (JP)

(73) Assignee: Nissin Chemical Industry Co., Ltd., Echizen (JP)

( * ) Notice: Subject to any disclaimer, the term of this patent is extended or adjusted under 35 U.S.C. 154(b) by 147 days.

(21) Appl. No.: 18/857,852

(22) PCT Filed: Apr. 19, 2023

(86) PCT No.: PCT/JP2023/015581
§ 371 (c)(1),
(2) Date: Oct. 18, 2024

(87) PCT Pub. No.: WO2023/204241
PCT Pub. Date: Oct. 26, 2023

(65) Prior Publication Data

US 2025/0270410 A1 Aug. 28, 2025

(30) Foreign Application Priority Data

Apr. 22, 2022 (JP) ................................ 2022-070949

(51) Int. Cl.
*B32B 3/10* (2006.01)
*C09D 11/023* (2014.01)
(Continued)

(52) U.S. Cl.
CPC ............ *C09D 11/30* (2013.01); *C09D 11/023* (2013.01); *C09D 11/102* (2013.01); *B41M 5/0047* (2013.01)

(58) Field of Classification Search
None
See application file for complete search history.

(56) References Cited

U.S. PATENT DOCUMENTS

2009/0289973 A1* 11/2009 Makuta ................ C09D 11/101 427/256
2010/0227067 A1 9/2010 Namba et al.
(Continued)

FOREIGN PATENT DOCUMENTS

JP 2009126964 A 6/2009
JP 2019006936 A 1/2019
(Continued)

OTHER PUBLICATIONS

Extended European Search Report corresponding to EP Application No. 23791889.1; dated Mar. 6, 2026 (38 pages).
(Continued)

*Primary Examiner* — Christopher M Polley
(74) *Attorney, Agent, or Firm* — Myers Bigel, P.A

(57) ABSTRACT

[Problem]
An object of the present invention is to provide an ink composition for inkjet printing that imparts a printed layer that is excellent in terms of tactile sensation, abrasion resistance, and adherence to a substrate, a printed material and a recorded material that have an ink layer formed from the ink composition, and an inkjet recording method.
[Solution]
An ink composition comprising the following components (A), (B) and (C), (A) an emulsion of a silicone acrylic copolymer resin in an amount of 0.5 to 20 parts by mass as a solid content,
(B) an emulsion of a urethane resin in an amount of 10 to 79.5 parts by mass as a solid content, and
(C) pigment in an amount of 20 to 89.5 parts by mass, provided that a total mass of the solid content of components (A) and (B) and component (C) is 100 parts by mass, wherein component (A) is an emulsion of a copolymer of (a1) a polyorganosiloxane represented by the following formula (1) in an amount of 60 to 99 parts by mass with (a2) an acrylic acid ester monomer and/or a methacrylic acid ester monomer in an amount of 1 to 40 parts by mass, provided that a total amount of components (a1) and (a2) is 100 parts by mass, (1)

wherein $R^1$ is, independently of each other, a substituted or unsubstituted monovalent hydrocarbon group having 1 to 20 carbon atoms, precluding the groups defined for $R^2$ and a phenyl group; $R^2$ is, independently of each other, an alkenyl group having 2 to 6 carbon atoms or an alkyl group having 1 to 6 carbon atoms and of which a part of the hydrogen atoms bonded to the carbon atom is substituted with a mercapto group, a vinyl group, an acryloxy group, or a methacryloxy group; $R^3$ is, independently of each other, a phenyl group or the group defined for $R^1$, and at least one of $R^3$s bonded to the silicon atom is a phenyl group; and X is, independently of each other, a substituted or unsubstituted monovalent hydrocarbon group having 1 to 20 carbon atoms, an alkoxy group having 1 to 20 carbon atoms, or a hydroxyl group; and a, b, c and d are the number satisfying equations: $0.11 \leq a/(a+b+c+d) < 1$, $0.00001 \leq b/(a+b+c+d) \leq 0.05$, $0 \leq c/(a+b+c+d) \leq 0.6$, and $0.000001 \leq d/(a+b+c+d) \leq 0.24$, based on the total number of a, b, c and d.

20 Claims, No Drawings

(51) Int. Cl.

| | |
|---|---|
| ***C09D 11/102*** | (2014.01) |
| ***C09D 11/30*** | (2014.01) |
| *B41M 5/00* | (2006.01) |

(56) References Cited

U.S. PATENT DOCUMENTS

| | | | | |
|---|---|---|---|---|
| 2013/0065028 | A1* | 3/2013 | Fujii | C09D 7/20<br>524/106 |
| 2013/0202861 | A1* | 8/2013 | Ohta | B41M 7/0027<br>347/100 |
| 2018/0291218 | A1 | 10/2018 | Umebayashi | |
| 2019/0292395 | A1* | 9/2019 | Matsumoto | C09D 11/037 |
| 2020/0102473 | A1 | 4/2020 | Watanabe | |
| 2020/0239972 | A1 | 7/2020 | Watanabe | |
| 2021/0198512 | A1 | 7/2021 | Nakao et al. | |
| 2021/0277239 | A1 | 9/2021 | Watanabe | |

FOREIGN PATENT DOCUMENTS

| | | | |
|---|---|---|---|
| JP | 2020055938 | A | 4/2020 |
| JP | 2020090563 | A | 6/2020 |
| JP | 2021107527 | A | 7/2021 |
| JP | 2021138942 | A | 9/2021 |
| WO | 2017104318 | A1 | 6/2017 |

OTHER PUBLICATIONS

English translation of International Search Report corresponding to International Patent Application No. PCT/JP2023/015581 (2 pages) (mailed Jul. 4, 2023).

* cited by examiner

INK COMPOSITION FOR AN INKJET, A RECORDED MATERIAL, AND A RECORDING METHOD WITH AN INKJET

TECHNICAL FIELD

The present invention relates to an inkjet ink composition, a recorded material, and an inkjet recording method.

BACKGROUND OF THE INVENTION

An inkjet recording system is a printing system that prints by jetting a liquid ink having high fluidity from a microscopic nozzle to attach the liquid ink to a substrate. This system is a relatively inexpensive device, has a characteristic feature that allows a high-resolution, high-quality image to be printed at a high speed with low noise, and has rapidly spread in recent years.

In the future, the use of an inkjet recording method for recording on a recording medium with low or no ink absorbency as a recording medium is also expected. For such a use, high levels of chromogenicity and fastness (abrasion resistance, light resistance, ozone resistance, water resistance, and the like) of images are required, and therefore an ink using a pigment as a coloring material is particularly useful.

In a printed material obtained by printing with a pigment ink containing a pigment as a coloring material, the pigment component tends to be localized on the surface of the recording medium and the printed material is highly chromogenic. The pigment remains on the surface of the recording medium due to the evaporation and penetration of a vehicle component that occur during or after the attachment of the ink to the recording medium. However, since the pigment that is the coloring material tends to be on the surface of the recording medium, the adherence, abrasion resistance, and the like of an ink film are particularly important for the pigment ink. In order to improve these properties in recording with the pigment ink, the addition of a urethane resin to the ink has been investigated.

For example, in Japanese Patent Application Laid-Open No. 2021-107527, a polyurethane resin dispersed in water is used in an aqueous inkjet ink. Although Japanese Patent Application Laid-Open No. 2021-107527 describes that an inkjet ink that is excellent in terms of durability and processability can be provided, there is a concern that the abrasion resistance is low when solely using a urethane resin, since a surface will not exhibit lubricity, resulting in snags.

Further, Japanese Patent Application Laid-Open No. 2019-6936 discloses that dimethyl silicone is essential for urethane, and fastness in terms of friction and washing can be imparted during printing. However, while the initial water resistance of dimethyl silicone is high, since the dimethyl silicone on a surface is vaporized or wiped off over time, it cannot be said that the performance is sufficient.

Furthermore, WO2017/104318 proposes that a liquid composition for inkjet printers that contains an acrylic-modified polyorganosiloxane in a powder form and a photopolymerizable monomer achieves high wear resistance. However, it is considered that adherence is lower due to containing an acrylic.

PRIOR LITERATURES

Patent Literatures

Patent Literature 1: Japanese Patent Application Laid-Open No. 2021-107527

Patent Literature 2: Japanese Patent Application Laid-Open No. 2019-6936

Patent Literature 3: WO2017/104318

DISCLOSURE OF THE INVENTION

Problems to be Solved by the Invention

The present invention has been made in view of the circumstances above. An object of the present invention is to provide an ink composition for inkjet printing that imparts a printed layer that is excellent in terms of tactile sensation, abrasion resistance, and adherence to a substrate, a printed material and a recorded material that have an ink layer formed from the ink composition, and an inkjet recording method.

Solutions to the Problems

As a result of extensive investigations for achieving the object above, the present inventor found that a layer formed from an ink composition obtained by blending a silicone-acrylic copolymer resin emulsion (A), a urethane-based resin emulsion (B), and a pigment (C) at a predetermined ratio is excellent in terms of tactile sensation, abrasion resistance, and adherence to a substrate. In particular, the present invention provides an aqueous ink composition for inkjet printing and a printed material having a film of the aqueous ink composition.

That is, the present invention provides an ink composition comprising the following components (A), (B) and (C), (A) an emulsion of a silicone acrylic copolymer resin in an amount of 0.5 to 20 parts by mass as a solid content, (B) an emulsion of a urethane resin in an amount of 10 to 79.5 parts by mass as a solid content, and (C) pigment in an amount of 20 to 89.5 parts by mass, provided that a total mass of the solid content of components (A) and (B) and component (C) is 100 parts by mass, wherein component (A) is an emulsion of a copolymer of (a1) a polyorganosiloxane represented by the following formula (1) in an amount of 60 to 99 parts by mass with (a2) an acrylic acid ester monomer and/or a methacrylic acid ester monomer in an amount of 1 to 40 parts by mass, provided that a total amount of components (a1) and (a2) is 100 parts by mass, (1)

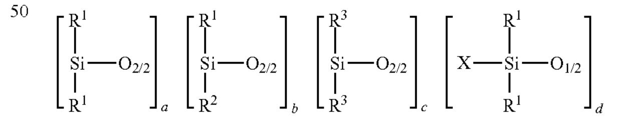

wherein $R^1$ is, independently of each other, a substituted or unsubstituted monovalent hydrocarbon group having 1 to 20 carbon atoms, precluding the groups defined for $R^2$ and a phenyl group; $R^2$ is, independently of each other, an alkenyl group having 2 to 6 carbon atoms or an alkyl group having 1 to 6 carbon atoms and of which a part of the hydrogen atoms bonded to the carbon atom is substituted with a mercapto group, a vinyl group, an acryloxy group, or a methacryloxy group; $R^3$ is, independently of each other, a phenyl group or the group defined for $R^1$, and at least one of $R^3$s bonded to the silicon atom is a phenyl group; and X is, independently of each other, a substituted or unsubstituted monovalent hydrocarbon group having 1 to 20 carbon atoms, an alkoxy group having 1 to 20 carbon atoms, or a hydroxyl group; and a, b, c and d are the number satisfying equations: $0.11 \leq a/(a+b+c+d) < 1$, $0.00001 \leq b/(a+b+c+d) \leq 0.05$, $0 \leq c/(a+b+c+d) \leq 0.6$, and $0.000001 \leq d/(a+b+c+d) \leq 0.24$, based on the total number of a, b, c and d.

The present invention further provides an ink composition comprising the following components (A'), (B') and (C) and water, (A') a silicone acrylic copolymer resin in an amount of 0.1 to 20 parts by mass % in the ink composition, (B') at least one resin selected from polyether polyurethane resins, polyester polyurethane resins and polycarbonate polyurethane resins, in an amount of 3 to 70 parts by mass % in the ink composition, and (C) pigment in an amount of 0.1 to 25 parts by mass % in the ink composition, wherein component (A') is a copolymer of (a1) a polyorganosiloxane represented by the following formula (1) in an amount of 60 to 99 parts by mass with (a2) an acrylic acid ester monomer and/or a methacrylic acid ester monomer in an amount of 1 to 40 parts by mass, provided that a total amount of components (a1) and (a2) is 100 parts by mass, (1)

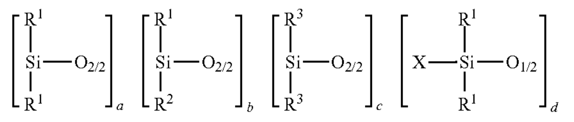

wherein $R^1$ is, independently of each other, a substituted or unsubstituted monovalent hydrocarbon group having 1 to 20 carbon atoms, precluding the groups defined for $R^2$ and a phenyl group; $R^2$ is, independently of each other, an alkenyl group having 2 to 6 carbon atoms or an alkyl group having 1 to 6 carbon atoms and of which a part of the hydrogen atoms bonded to the carbon atom is substituted with a mercapto group, a vinyl group, an acryloxy group, or a methacryloxy group; $R^3$ is, independently of each other, a phenyl group or the group defined for $R^1$, and at least one of $R^3$s bonded to the silicon atom is a phenyl group; and X is, independently of each other, a substituted or unsubstituted monovalent hydrocarbon group having 1 to 20 carbon atoms, an alkoxy group having 1 to 20 carbon atoms, or a hydroxyl group; and a, b, c and d are the number satisfying equations: $0.11 \leq a/(a+b+c+d) < 1$, $0.00001 \leq b/(a+b+c+d) \leq 0.05$, $0 \leq c/(a+b+c+d) \leq 0.6$, and $0.000001 \leq d/(a+b+c+d) \leq 0.24$, based on the total number of a, b, c and d.

Further, the present invention provides a recorded material or a printed material having a recording medium and a layer formed from the ink composition that is attached to the recording medium. In particular, the present invention provides a recorded material or a printed material having a recording medium with low or no ink absorbency. The present invention also provides a method for producing a printed material including a process of printing by discharging the ink composition from an inkjet head to attach the ink composition to a recording medium. Furthermore, the present invention provides an inkjet recording method including a process of printing by discharging the ink composition of the present invention from an inkjet head to attach the ink composition to a recording medium.

Effects of the Invention

The ink composition of the present invention provides a printed material and a recorded material having an ink layer that is excellent in terms of tactile sensation, abrasion resistance, and adherence to a substrate. In particular, the ink composition imparts a printed layer that is excellent in terms of application properties, adherence, and fixing properties to a recording medium with low or no ink absorbency, and excellent in terms of tactile sensation, abrasion resistance, durability, and the like. The ink composition of the present invention is useful as an ink composition for inkjet printing.

DETAILED DESCRIPTION OF THE INVENTION

The present invention is an ink composition obtained by blending the silicone-acrylic copolymer resin emulsion (A), the urethane-based resin emulsion (B), and the pigment (C) at a predetermined ratio. Hereinafter, the components in are described in detail.

(A) Silicone-Acrylic Copolymer Resin Emulsion

The component (A) is an emulsion of a silicone-10 acrylic copolymer resin that is a copolymer of 60 to 99 parts by mass of a polyorganosiloxane (a1) represented by the following general formula (1) and 1 to 40 parts by mass of an acrylic acid ester monomer and/or a methacrylic acid ester monomer (a2) (the total amount of the components (a1) 15 and (a2) is 100 parts by mass).

(1)

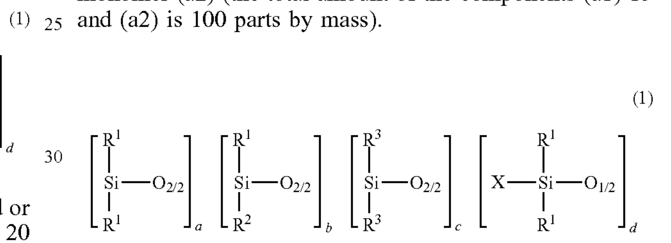

wherein, $R^1$ is, independently of each other, a substituted or unsubstituted monovalent hydrocarbon group having 1 to 20 carbon atoms, provided that the group defined by $R^2$ described below and a phenyl group are excluded; $R^2$ is, independently of each other, an alkenyl group having 2 to 6 carbon atoms, or an alkyl group having 1 to 6 carbon atoms in which the hydrogen atoms bonded to the carbon atoms are partially substituted with a mercapto group, a vinyl group, an acryloxy group, or a methacryloxy group; $R^3$ is, independently of each other, a phenyl group or the group defined by $R^1$ above; at least one $R^3$ is a phenyl group; X is, independently of each other, a substituted or unsubstituted monovalent hydrocarbon group having 1 to 20 carbon atoms, an alkoxy group having 1 to 20 carbon atoms, or a hydroxyl group; a, b, c, and d are real numbers; and, with respect to the sum of a, b, c, and d, a is a number satisfying $0.11 \leq a/(a+b+c+d) < 1$, b is a number satisfying $0.00001 \leq b/(a+b+c+d) \leq 0.05$, c is a number satisfying $0 \leq c/(a+b+c+d) \leq 0.6$, and d is a number satisfying $0.000001 \leq d/(a+b+c+d) \leq 0.24$. More specifically, the component (A) is an emulsion of a silicone-acrylic copolymer resin obtained by the emulsification graft polymerization of the polyorganosiloxane (a1) represented by the general formula (1) above with the acrylic acid ester monomer and/or the methacrylic acid ester monomer (a2).

With respect to a total of 100 parts by mass of the components (a1) and (a2), the amount of the component (a1) is preferably 60 parts by mass to 99 parts by mass, and the amount of the component (a2) is preferably 1 part by mass to 40 parts by mass. The amount of the component (a1) is more preferably 70 parts by mass to 95 parts by mass, and the amount of the component (a2) is more preferably 5 parts by mass to 30 parts by mass.

(1)

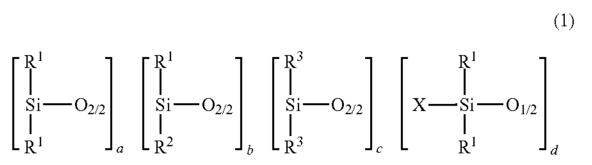

$R^1$ is, independently of each other, a substituted or unsubstituted, monovalent hydrocarbon group having 1 to 20, preferably 1 to 10, more preferably 1 to 6 carbon atoms. Examples of the monovalent hydrocarbon group include alkyl groups such as methyl, ethyl, propyl, butyl, pentyl, hexyl, heptyl, octyl, nonyl, decyl, dodecyl, tetradecyl, hexadecyl, and octadecyl groups; cycloalkyl groups such as cyclopentyl, cyclohexyl, and cycloheptyl groups; aryl groups such as tolyl and naphthyl groups; alkenylaryl groups such as a vinylphenyl group; aralkyl groups such as benzyl, phenylethyl, and phenylpropyl groups; and alkenylaralkyl groups such as vinylbenzyl and vinylphenylpropyl groups; and those groups in which a part or all of the hydrogen atoms are substituted with a halogen atom such as fluorine, bromine, or chlorine, a carboxyl group, an alkoxy group, an alkenyloxy group, an amino group, an alkyl group or an alkoxy group. $R^1$ is preferably an unsubstituted alkyl group having 1 to 6 carbon atoms, more preferably a methyl group.

$R^2$ is, independently of each other, an alkenyl group having 2 to 6 carbon atoms or an alkyl group which has 1 to 6 carbon atoms and of which a part of the hydrogen atoms bonded to a carbon atom is substituted with a mercapto group, a vinyl group, an acryloxy group, or a methacryloxy group. Examples of the alkenyl group having 2 to 6 carbon atoms include vinyl and allyl groups. $R^2$ is preferably an alkyl group having 1 to 6 carbon atoms and having an acryloxy or methacryloxy group. The aforesaid alkyl group is preferably a methyl group, an ethyl group, or a propyl group. $R^3$ is, independently of each other, a phenyl group or the aforesaid group defined for $R^1$. At least one of $R^3$ bonded to the silicon atom is a phenyl group.

X is, independently of each other, a substituted or unsubstituted, monovalent hydrocarbon group having 1 to 20, preferably 1 to 10, more preferably 1 to 6 carbon atoms; an alkoxy group having 1 to 20, preferably 1 to 10, more preferably 1 to 4 carbon atoms; or a hydroxyl group. Examples of the substituted or unsubstituted monovalent hydrocarbon group having 1 to 20 carbon atoms include the aforesaid groups defined for $R^1$. Examples of the alkoxy group having 1 to 20 carbon atoms include methoxy, ethoxy, propoxy, butoxy, hexyloxy, heptyloxy, octyloxy, decyloxy, and tetradecyloxy groups. X is preferably a hydroxyl, methoxy, ethoxy, methyl, or butyl group.

a, b, c and d are real numbers, and, with respect to the sum of a, b, c and d, a is a number satisfying $0.11 \le a/(a+b+c+d) < 1$, for example, 0.999999 or less, or preferably a number satisfying $0.59 \le a/(a+b+c+d) \le 0.99998$. b is, with respect to the sum of a, b, c and d, a number satisfying $0.00001 \le b/(a+b+c+d) \le 0.05$, or preferably a number satisfying $0.00001 \le b/(a+b+c+d) \le 0.01$. c is, with respect to the sum of a, b, c and d, a number satisfying $0 \le c/(a+b+c+d) \le 0.6$, or preferably a number satisfying $0 \le c/(a+b+c+d) \le 0.30$. d is, with respect to the sum of a, b, c and d, a number satisfying $0.000001 \le d/(a+b+c+d) \le 0.24$, or preferably a number satisfying $0.00001 \le d/(a+b+c+d) \le 0.1$. If b is more than 5% by mass, an improvement in the tactile sensation of a coating film no longer appears, and antifouling properties also decrease. If d is more than 24.0% by mass, the weight average molecular weight decreases and an improvement in tactile sensation no longer appears, which is not preferable. c is the number of siloxane units having a phenyl group. Having c within the range above is preferable in terms of transparency and heat resistance.

The polyorganosiloxane (a1) has a weight average molecular weight of 5,000 to 500,000, preferably 8,000 to 450,000, more preferably 100,000 to 450,000, still more preferably 150,000 to 400,000. If the polyorganosiloxane has the aforesaid weight average molecular weight, a coating agent provides a good sliding property peculiar to silicones.

Here, the molecular weight of the polyorganosiloxane, M, is calculated from the specific viscosity, ηsp, at 25° C. of a 1 g/100 ml solution of the polyorganosiloxane in toluene.

$$\eta sp = (\eta/\eta 0) - 1$$

(η0: viscosity of toluene, n: viscosity of the solution)

$$\eta sp = [\eta] + 0.3[\eta] \text{ square}$$

$$[\eta] = 2.15 \times 10^{-4} M^{0.65}$$

More specifically, 20 g of the emulsion is mixed with 20 g of IPA (isopropyl alcohol) to break the emulsion and, then, IPA is removed and a residual rubbery polyorganosiloxane is dried at 105° C. for 3 hours. The resulting polyorganosiloxane is dissolved in toluene in a concentration of 1 g/100 ml. A viscosity of the solution is determined at 25° C. by a Ubbelohde viscometer. The molecular weight, M, is calculated by substituting the viscosity in the aforesaid equation (Reference: Nakamuta, Journal of the Chemical Society of Japan, 77, 858; Doklady Akad. Nauk. U.S.S.R. 89 65 [1953]).

The aforesaid polyorganosiloxane (a1) is preferably in a form of an emulsion and may be a commercially available product or may be synthesized in house. The polyorganosiloxane (a1) may be easily synthesized in any known emulsion polymerization method. For example, a cyclic organosiloxane which may have a fluorine atom, a (meth)acryloxy group, a carboxyl group, a hydroxyl group, or an amino group, or an α,ω-dihydroxysiloxane oligomer, an α,ω-dialkoxysiloxane oligomer, or an alkoxysilane and a silane coupling agent represented by the following formula (2) are emulsified and dispersed in water with an anionic surfactant and, then, polymerized, if needed, in the presence of a catalyst such as an acid to obtain the polyorganosiloxane (a1).

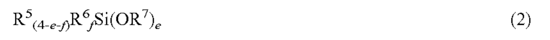

$$R^5_{(4-e-f)}R^6_fSi(OR^7)_e \quad (2)$$

wherein $R^5$ is a monovalent organic group having a polymerizable double bond, specifically an alkyl group which has 1 to 6 carbon atoms and is substituted with an acryloxy or methacryloxy group; $R^6$ is an alkyl group having 1 to 4 carbon atoms; $R^7$ is an alkyl group having 1 to 4 carbon atoms; e is an integer of 2 or 3; f is an integer of 0 or 1; and e+f=2 or 3.

Examples of the aforesaid cyclic organosiloxane include hexamethylcyclotrisiloxane (D3), octamethylcyclotetrasiloxane (D4), decamethylcyclopentasiloxane (D5), dodecamethylcyclohexasiloxane (D6), 1,1-diethylhexamethylcyclotetrasiloxane, phenylheptamethylcyclotetrasiloxane, 1,1-diphenylhexamethylcyclotetrasiloxane, 1,3,5,7-tetravinyltetramethylcyclotetrasiloxane, 1,3,5,7- tetramethylcyclotetrasiloxane, 1,3,5,7-tetracyclohexyltetramethylcyclotetrasiloxane, tris(3,3,3-trifluoropropyl)trimethylcyclotrisiloxane, 1,3,5,7-tetra(3-methacryloxypropyl)tetramethylcyclotetrasiloxane, 1,3,5,7-tetra(3-acryloxypropyl)tetramethylcyclotetrasiloxane, 1,3,5,7-tetra(3-carboxypropyl)tetramethylcyclotetrasiloxane, 1,3,5,7-tetra(3-vinyloxypropyl)tetramethylcyclotetrasiloxane, 1,3,5,7-tetra(p-vinylphenyl)tetramethylcyclotetrasiloxane, 1,3,5,7-tetra[3-(p-vinylphenyl)propyl]tetramethylcyclotetrasiloxane, 1,3,5,7-tetra(N-acryloyl-N-methyl-3-aminopropyl)tetramethylcyclotetrasiloxane, and 1,3,5,7-tetra(N,N-bis(lauroyl)-3-aminopropyl)tetramethylcyclotetrasiloxane. Octamethylcyclotetrasiloxane and decamethylcyclopentasiloxane are preferred.

Examples of the silane coupling agent include acrylic silanes such as γ-(meth)acryloxypropyltrimethoxysilane, γ-(meth)acryloxypropyltriethoxysilane, γ-(meth)acryloxypropyltripropoxysilane, γ-(meth)acryloxypropyltriisopropoxysilane, γ-(meth)acryloxypropyltributoxysilane, γ-(meth)acryloxypropylmethyldimethoxysilane, γ-(meth)acryloxypropylmethyldiethoxysilane, γ-(meth)acryloxypropylmethyldipropoxysilane, γ-(meth)acryloxypropylmethyldiisopropoxysilane, and γ-(meth)acryloxypropylmethyldibutoxysilane; and mercaptosilanes such as γ-mercaptopropylmethyldimethoxysilane and γ-mercaptopropyltrimethoxysilane. Oligomers obtained by the condensation polymerization of the aforesaid silanes are sometimes preferred for decreasing the generation of an alcohol. In particular, acrylic silanes are preferred. The (meth)acryloxy herein means acryloxy or methacryloxy. These silane coupling agents are preferably used in an amount of 0.01 to 10 parts by mass, more preferably 0.01 to 5 parts by mass, relative to 100 parts by mass of the cyclic organosiloxane. If the amount is less than 0.01 part by mass, the transparency of the coating agent thus obtained is lower. If the amount is more than 10 parts by mass, the coating agent may not have a sliding property.

The cyclic organosiloxane is copolymerized with the silane coupling agent above to introduce a polymerizable group ($R^2$) into the polyorganosiloxane. As a result, the (meth)acrylic acid ester monomer (a2) is grafted to the polyorganosiloxane (a1).

The polymerization catalyst used for the polymerization may be any known polymerization catalysts. Among them, strong acids are preferred such as hydrochloric acid, sulfuric acid, dodecylbenzenesulfonic acid, citric acid, lactic acid, and ascorbic acid. Dodecylbenzenesulfonic acid has an emulsifying ability and is preferred.

The acid catalyst is preferably used in an amount of 0.01 to 10 parts by mass, more preferably 0.2 to 2 parts by mass, relative to 100 parts by mass of the cyclic organosiloxane.

Examples of the surfactant to be used in the polymerization include anionic surfactants such as sodium lauryl sulfate, sodium laurate sulfate, N-acylamino acid salts, N-acyl taurine salts, aliphatic soaps, and alkyl phosphates. Preferred are anionic surfactants which are easily soluble in water and have no polyethylene oxide chain. More preferred are N-acylamino acid salts, N-acyl taurine salts, aliphatic soaps, and alkyl phosphates, and particularly preferred are sodium methyl lauroyl taurate, sodium methyl myristoyl taurate, and sodium lauryl sulfate.

The anionic surfactant is preferably used in an amount of 0.1 to 20 parts by mass, more preferably 0.5 to 10 parts by mass, relative to 100 parts by mass of the cyclic organosiloxane.

The polymerization temperature is preferably 50 to 75° C. and the polymerization time is preferably 10 hours or more, more preferably 15 hours or more. Further, the polymerization is preferably followed by aging at 5 to 30° C. for 10 hours or more.

(a2) The acrylic acid ester or the methacrylic acid ester, hereinafter also referred to as the "acrylic component", is a linear or branched alkyl ester having 1 to 20 carbon atoms, preferably 1 to 6 carbon atoms, or more preferably 1 to 3 carbon atoms. The acrylic acid ester or the methacrylic acid ester may have a functional group, such as an amide group, a vinyl group, a carboxyl group, or a hydroxyl group. Examples of the acrylic acid ester or the methacrylic acid ester include methyl acrylate, ethyl acrylate, butyl acrylate, 2-ethylhexyl acrylate, methyl methacrylate, ethyl methacrylate, butyl methacrylate, and 2-ethylhexyl methacrylate. It may be required that one type alone or two or more types thereof be copolymerized. Methyl acrylate, ethyl acrylate, methyl methacrylate, or ethyl methacrylate is preferred. The acrylic acid ester or the methacrylic acid ester preferably has a glass transition temperature, hereinafter also referred to as Tg, of 120° C. or lower, or more preferably 110° C. or lower. The lower limit thereof is preferably −50° C. The component (a2) is adjusted such that the Tg of the resulting silicone-acrylic copolymer resin is 0° C. or higher, or preferably 5° C. or higher, and the aforesaid graft copolymerization is performed. When the silicone-acrylic copolymer resin has the Tg above, a resin having high antifouling performance is obtained.

The graft copolymerization of the polyorganosiloxane (a1) above with the (meth)acrylic acid ester monomer (a2) may be required to be performed in accordance with a conventionally known method, for example, a method using a radical initiator. The radical initiator is not particularly limited, and examples thereof include persulfates, such as potassium persulfate or ammonium persulfate, aqueous hydrogen persulfate, t-butyl hydroperoxide, and hydrogen peroxide. If necessary, a redox initiator system in which a reducing agent, such as acidic sodium sulfite, Rongalite, L-ascorbic acid, tartaric acid, a saccharide, or an amine, is used in combination, may also be used.

In order to improve the stability of the emulsion, sodium lauryl sulfate, sodium laureth sulfate, an N-acyl amino acid salt, an N-acyl taurine salt, an aliphatic soap, an alkyl phosphate, or the like may be added as an anionic surfactant. A nonionic emulsifier, such as polyoxyethylene lauryl ether or polyoxyethylene tridecyl ether, may also be added.

Furthermore, a chain-transfer agent may be added to adjust the molecular weight.

The solid content of the silicone-acrylic copolymer resin emulsion (A) is preferably 35% by mass to 50% by mass. The viscosity (at 25° C.) of the silicone-acrylic copolymer resin emulsion (A) is preferably 500 mPa·s or less, or more preferably 20 mPa·s to 300 mPa·s. The viscosity may be measured with a rotational viscometer. The average primary particle diameter of emulsion particles of the emulsion is preferably 1,000 nm or less, more preferably 100 nm to 500 nm, or still more preferably 150 nm to 350 nm. If the average primary particle diameter is too large, bleaching appears. If the average primary particle diameter is too small, there is a problem in which dispersibility decreases. The average primary particle diameter of the emulsion particles of the resin emulsion is the volume-based average particle diameter measured with a JEM-2100™ provided by JEOL Ltd.

The amount of the silicone-acrylic copolymer resin emulsion that is the component (A) is, in terms of solid content and with respect to a total of 100 parts by mass of the component (C) and the solid contents of the components (A) and (B), preferably 0.5 part by mass to 20 parts by mass, more preferably 1.5 parts by mass to 20 parts by mass, or still more preferably 2 parts by mass to 15 parts by mass. The glass transition temperature Tg of the silicone-acrylic copolymer resin (A) is preferably 0° C. or higher, or more preferably 5° C. or higher. The glass transition temperature, hereinafter also referred to as Tg, may be measured with a flow tester after drying the emulsion.

An ink layer formed from an ink composition for inkjet printing containing the silicone-acrylic copolymer resin emulsion (A) above has excellent water resistance, moisture resistance, high luster, and alcohol resistance. The amount of the component (A) in 100% by mass of the ink composition of the present invention is, in terms of solid content, preferably 0.1% to 20%, more preferably 0.4% to 18%, still more preferably 0.5% to 15%, even more preferably 0.6% to 10%, or particularly preferably 1.5% to 8%. If the solid content of the component (A) is less than the lower limit above, tactile sensation, abrasion resistance, and antifouling properties cannot be sufficiently exhibited. If the solid content of the component (A) is more than the upper limit above, the surface of a coating film may be easily fouled.

(B) Urethane-Based Resin Emulsion

As (B) urethane-based resin emulsion, a urethane-based resin emulsion synthesized by any known method, for example, an emulsion polymerization method using an anionic or nonionic emulsifier or the like may be used or a commercially available product may be used. Examples of a urethane-based resin include various water-soluble urethane-based resins that are products of reacting polyisocyanate with a polyol, such as a polyether-based, polycarbonate-based, or polyester-based polyol. The urethane-based resin emulsion is obtained by the emulsification of these urethane-based resins. In order to impart a film-forming function to the urethane-based resin emulsion, the particle diameter of emulsion particles is preferably 10 nm to 500 nm. The viscosity (at 25° C.) of the urethane-based resin is preferably 10 mPa·s to 500 mPa·s. The glass transition temperature Tg of the urethane-based resin is 120° C. or lower, preferably 60° C. or lower, or more preferably 30° C. or lower. The lower limit value of the glass transition temperature is preferably −50° C. The glass transition temperature may be measured in accordance with JIS K 7121.

Examples of a commercially available polyether-based urethane resin emulsion include ADEKA BONTIGHTER HUX-350 manufactured by ADEKA CORPORATION; WLS-201 and WLS-202 manufactured by DIC Corporation; and SUPERFLEX E-4000 and E-4800 manufactured by DKS Co. Ltd. Examples of a polycarbonate-based urethane resin emulsion include WLS-210 and WLS-213 manufactured by DIC Corporation; UW-1005E and UW-5502 manufactured by Ube Industries, Ltd.; PERMARIN UA-368 manufactured by Sanyo Chemical Industries, Ltd.; and SUPERFLEX 460 and 470 manufactured by DKS Co. Ltd. Examples of a polyester-based urethane resin emulsion include ADEKA BONTIGHTER HUX-380 and HUX-540 manufactured by ADEKA CORPORATION; and SUPERFLEX 420 and 860 manufactured by DKS Co. Ltd.

The average particle diameter of the emulsion particles of the urethane-based resin emulsion (B) is preferably 10 nm to 500 nm, more preferably 20 nm to 350 nm, or still more preferably 20 nm to 150 nm. The average particle diameter is the volume-based average particle diameter measured with a JEM-2100™ provided by JEOL Ltd.

The amount of the resin emulsion that is the component (B) is, in terms of solid content and with respect to a total of 100 parts by mass of the component (C) and the solid contents of the components (A) and (B), 10 parts by mass to 79.5 parts by mass, preferably 20 parts by mass to 79 parts by mass, or more preferably 25 parts by mass to 75 parts by mass. The amount of the component (B) contained in the ink composition is, in terms of solid content, 3% by mass to 80% by mass, preferably 3.5% by mass to 70% by mass, more preferably 4% by mass to 30% by mass, or still more preferably 4.5% by mass to 15% by mass. If the amount of this resin emulsion is, in terms of solid content, less than the lower limit above, there is a problem in which coating film properties, such as wear resistance, significantly deteriorate. If the amount of this resin emulsion is, in terms of solid content, more than the upper limit above, there is a problem in which tactile sensation deteriorates.

(C) Pigment

The pigment (C) may be required to be a conventionally known pigment to be blended in an ink composition, and may be any of an inorganic pigment and an organic pigment. Examples of the inorganic pigment include titanium oxide, red iron oxide (red ocher), yellow iron oxide, black iron oxide, Prussian blue, zinc oxide, cobalt blue, emerald green, viridian, titanium white, and carbon black. Examples of the organic pigment include alkali blue, lithol red, carmine 6B, disazo yellow, phthalocyanine blue, quinacridone red, and isoindoline yellow.

Examples of the pigment used in the present invention, in terms of the Colour Index, include Pigment White 4, 6, and 21; Pigment Black 7 (carbon black); Pigment Blue 15, 15:1, 15:3, 15:4, 15:6, and 60; Pigment Green 7 (chlorinated phthalocyanine green) and 36 (brominated phthalocyanine green); Pigment Red 9, 48, 49, 52, 53, 57, 57:1, 97, 122, 149, 168, 177, 178, 179, 206, 207, 209, 242, 254, and 255; Pigment Violet 19, 23, 29, 30, 37, 40, and 50; Pigment Yellow 12, 13, 14, 17, 20, 24, 74, 83, 86, 93, 94, 95, 109, 110, 117, 120, 125, 128, 137, 138, 139, 147, 148, 150, 151, 154, 155, 166, 168, 180, 185, and 213; and Pigment Orange 36, 43, 51, 55, 59, 61, 71, and 74.

The average particle diameter of the pigment (C) is not particularly limited, and is preferably 5 nm to 10 μm, or more preferably 10 nm to 5 μm. The average particle diameter may be measured as a cumulative volume-based average (or a median diameter) in the measurement of a particle size distribution by a laser diffraction method.

The amount of the pigment (C) is, with respect to a total of 100 parts by mass of the component (C) and the solid contents of the components (A) and (B), 20 parts by mass to 89.5 parts by mass, or preferably 20 parts by mass to 80 parts by mass. The amount of the pigment (C) contained in the ink composition is 0.1% by mass to 25% by mass, preferably 0.5% by mass to 20% by mass, or more preferably 1% by mass to 15% by mass. If the amount of the pigment is less than the lower limit above, there is a problem in which masking properties are not obtained and design properties cannot be changed. If the amount of the pigment is more than the upper limit above, there is a problem in which dispersibility is poor and blobs and the like form, which is not preferable.

(D) Water-Soluble Organic Solvent

The ink composition of the present invention may further contain a water-soluble organic solvent. Examples of the water-soluble organic solvent include ethylene glycol monoether, diethylene glycol monoether, propylene glycol monoether, ethylene glycol dimethyl ether, diethylene glycol dimethyl ether, ethylene glycol, diethylene glycol, propylene glycol, glycerol, methanol, ethanol, isopropyl alcohol, methyl ethyl ketone, Methyl Cellosolve, Ethyl Cellosolve, acetone, ethyl acetate, diacetone alcohol, and 1,3-propanediol. These water-soluble organic solvents may be used alone or in combination of two or more types thereof.

The water-soluble organic solvent preferably has 3 or more carbon atoms. An organic solvent having less than 3 carbon atoms may reduce the stability of the emulsion. The water-soluble organic solvent more preferably has 10 or less carbon atoms. The solubility parameter (SP value) of the water-soluble organic solvent is preferably 10 or more. Examples of an organic solvent having an SP value of 10 or more and 3 or more carbon atoms include glycerol (SP value: 21.1), 1,3-propanediol (SP value: 13.5), diethylene glycol (SP value: 14.6), and propylene glycol (SP value: 14.8). The upper limit of the SP value is not particularly limited, and is usually 30 or less.

The amount of the water-soluble organic solvent contained (% by mass) in the ink composition of the present invention is, in total and with respect to the total mass of the inkjet ink composition, preferably 3% by mass or more and 70% by mass or less, more preferably 5% by mass to 60% by mass, still more preferably 15% by mass to 55% by mass, or even more preferably 25% by mass to 50% by mass.

The ink composition according to a preferable embodiment of the present invention is a water-containing aqueous ink composition. As a result, a polymer will be more easily dispersed in an emulsion state, and an image that is further excellent in terms of fixing properties and abrasion resistance is more easily formed by an inkjet method.

The amount of water contained is, with respect to the total amount of the ink composition, 10% by mass or more, preferably 15% by mass or more, or more preferably 20% by mass or more. Herein, examples of the water in the ink composition include water derived from: a dispersion of polymer particles used as a starting material; a pigment dispersion; and water added. When the amount of water contained is 10% by mass or more, the viscosity of the ink composition is made relatively low. The upper limit of the amount of water contained is, with respect to the total amount of the ink composition, preferably 90% by mass or less, more preferably 85% by mass or less, or still more preferably 80% by mass or less.

The ink composition of the present invention is obtained by mixing a dispersion in which the silicone-acrylic copolymer resin emulsion (A), the urethane-based resin emulsion (B), and the pigment (C) are dispersed in water in advance, the optional organic solvent (D), and water with any known mixing and preparing method, such as a propeller stirrer, a homogenizer, a ball mill, a bead mill, or a disperser/mixer.

For example, while the component (B) is stirred with a disperser/mixer at 100 rpm to 1,000 rpm, the component (A), an aqueous dispersion of the component (C), and the optional component (D) are added, and the mixture is stirred at 500 rpm to 1,500 rpm for 30 minutes to obtain an aqueous ink composition.

An antioxidant, an ultraviolet absorber, an antifreezing agent, a pH adjuster, a preservative, an antifoaming agent, an antimicrobial agent, an antifungal agent, a photostabilizer, an antistatic agent, a plasticizer, a flame retardant, a thickener, a surfactant, an organic solvent such as a coalescing aid, another resin, or the like may be added to the ink composition of the present invention within a range that does not affect the performance. The amounts of any other components added are not particularly limited. For example, an antifoaming agent or a surfactant may be blended in an amount, with respect to the total mass of the ink composition, of preferably 0.01% to 5%, or more preferably 0.1% to 3%.

The ink composition of the present invention is preferably used in an inkjet recording method. The recording medium is not particularly limited, and a recording medium with low or no ink absorbency is preferred. The recording medium with low or no ink absorbency refers to a recording medium having a property in which an ink is substantially unabsorbed or completely unabsorbed. More specifically, in the present invention, a recording medium with low or no ink absorbency refers to a recording medium in which the amount of water absorbed from the beginning of contact to 30 $msec^{1/2}$ by the Bristow method is 10 $mL/m^2$ or less. The Bristow method is the most commonly used method for measuring amounts of absorbed liquids in a short period of time, and is also used by the Japan Technical Association of the Pulp and Paper Industry (JAPAN TAPPI). The details of the test method thereof is described in Standard No. 51 "Paper and Cardboard-Liquid Absorbency Test Method—Bristow Method" of "JAPAN TAPPI Pulp and Paper Test Methods (2000)."

Examples of a recording medium with low or no ink absorbency include a medium with a recording surface not having an ink-receiving layer with ink absorbency, and a medium with a recording surface having a coating layer with low ink absorbency.

The recording medium with no ink absorbency is not particularly limited, and examples thereof include substrates, such as a plastic film not having an ink-absorbing layer, a sheet in which a substrate such as paper is coated with a plastic, and a sheet in which a plastic film is bonded to a substrate such as paper. Examples of the plastic include polyvinyl chloride, polyethylene terephthalate, polycarbonate, polystyrene, polyurethane, polyethylene, and polypropylene.

The recording medium with low ink absorbency is not particularly limited, and examples thereof include substrates, such as coated paper having a coating layer for receiving an oil-based ink on its surface. The coated paper is not particularly limited, and examples thereof include actual printing stock, such as art paper, coated paper, and matte paper.

The ink composition of the present invention more easily form a predetermined printed material that is favorable in terms of fixing properties and abrasion resistance even on such recording mediums with low or no ink absorbency.

In an inkjet recording method according to the present invention, the recording medium to which an ink is to be attached is more preferably one containing a polyolefin (polyethylene, polypropylene, or the like), or polyethylene terephthalate (PET) as a main component. Such a recording medium is generally a recording medium on which an ink is difficult to fix. The ink composition of the present invention has a particularly excellent effect in which a printed layer having excellent fixing properties and abrasion resistance for such a substrate is formed. Accordingly, the ink composition of the present invention is particularly preferably used in inkjet recording on a recording medium containing a polyolefin (polyethylene, polypropylene, or the like), or polyethylene terephthalate (PET) as a main component.

According to the inkjet recording method of the present invention, for example, intermittent discharge stability is secured when the ink composition of the present invention is discharged from an inkjet head to form a printed material layer on the recording medium, and a printed material having both fixing properties and abrasion resistance is obtained.

The inkjet recording method of the present invention may be required to be performed in accordance with a conventionally known method. For example, the method is a method in which the ink composition of the present invention is discharged from an inkjet-mode recording head and attached to the recording medium to record a printed material. Examples of a mode of discharging an ink composition include a mode in which mechanical energy caused by an electrostrictive element is imparted to the ink composition, and a mode in which heat energy is imparted to the ink composition. In the present invention, the use of a mode in which mechanical energy caused by an electrostrictive element is imparted to the ink composition is particularly preferred. A recording method is performed with an inkjet recording device having the inkjet head above.

EXAMPLES

The present invention will be explained below in further detail with reference to a series of the Examples and the Comparative Examples, though the present invention is in no way limited by these Examples.

Hereinafter, "part" or "%" represents part by mass or mass %, respectively. The resin emulsions obtained in the following Preparation Examples and Comparative Preparation Examples was evaluated by the following determined method.

Particle Diameter

The particle diameter was determined by JEM-2100™, ex JEOL.

Method of Determining a Glass Transition Temperature Tg

The glass transition temperature Tg was determined by applying a load of 5 kgf to about 1 g of silicone acrylic copolymer resin powder obtained by spray drying and elevating a temperature at 5° C./min by a flow tester ex. Shimadzu Corporation.

Determination of a Solid Content

Approximately 1 g of each of the resin emulsion (sample) was placed in an aluminum foil dish and accurately weighed, placed in a dryer kept at about 105° C. to 110° C., left for 1 hour, taken out from the dryer, allowed to cool in a desiccator and, then, weighed. A solid content was calculated by the following formula.

$$R = \frac{T - L}{W - L} \times 100$$

R: Solid content in %

W: Mass in gram of the aluminum foil dish and the undried sample

L: Mass in gram of the aluminum foil dish

T: Mass in gram of the aluminum foil dish and the dried sample

Dimensions of aluminum foil plate: 70φ×12 h (mm)

Preparation of the Silicone Acrylic Copolymer Resin Emulsion (A)

Preparation Example 1

600 Grams of octamethylcyclotetrasiloxane, 0.48 g of γ-methacryloxypropyl methyldiethoxysilane, a solution of 6 g of sodium lauryl sulfate in 54 g of pure water and a solution of 6 g of dodecylbenzene sulfonate in 54 g of pure water were placed in a 2 L-beaker made of polyethylene, and uniformly emulsified by a homomixer, which was then diluted by adding 470 g of water little by little, and passed through a high-pressure homogenizer at a pressure of 300 kgf/cm$^2$ twice to obtain a uniform milky-white emulsion. The emulsion was transferred to a 2 L-glass flask equipped with a stirrer, a thermometer and a reflux condenser, and allowed to polymerize at 55° C. for 24 hours, followed by aging at 15° C. for 24 hours and neutralization around a neutral point with 12 g of a 10% aqueous solution of sodium carbonate.

The structure of the polyorganosiloxane obtained by the polymerization was confirmed by $^1$H-NMR and $^{29}$Si-NMR (JNM-ECA600, determination solvent: $CDCl_3$; $^1$H: frequency: 600 MHz, room temperature, integration times: 128; and $^{29}$Si: frequency: 600 MHZ, room temperature, integration times: 5000). The polyorganosiloxane was represented by the following formula (1-1) and had an Mw (weight average molecular weight determined by the aforesaid method) of 250,000.

(1-1)

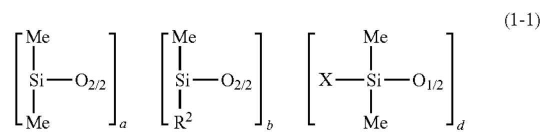

wherein $R^2$ is a γ-methacryloxypropyl group and X is a hydroxyl or ethoxy group and the proportions of a, b and d are shown in Table 1.

To the aforesaid neutralized reaction mixture (containing 534 g of the polyorganosiloxane obtained above), 232 g of methyl methacrylate (MMA) was added dropwise over a period of 3 to 5 hours under a redox reaction between a peroxide and a reducing agent at 30° C. to proceed acrylic copolymerization with the polyorganosiloxane to obtain a silicone acrylic copolymer resin emulsion having a solid content of 45.2%. The average particle diameter and solid content of the silicone acrylic copolymer resin emulsion are shown in Table 2.

Preparation Example 2

600 Grams of octamethylcyclotetrasiloxane, 0.60 g of γ-methacryloxypropyl methyldiethoxysilane, a solution of 6 g of sodium lauryl sulfate in 54 g of pure water and a solution of 6 g of dodecylbenzene sulfonate in 54 g of pure water were placed in a 2 L-beaker made of polyethylene, and uniformly emulsified by a homomixer, which was then diluted by adding 470 g of water little by little, and passed through a high-pressure homogenizer at a pressure of 300 kgf/cm$^2$ twice to obtain a uniform milky-white emulsion. The emulsion was transferred to a 2 L-glass flask equipped with a stirrer, a thermometer and a reflux condenser, and allowed to polymerize at 55° C. for 24 hours, followed by aging at 5° C. for 24 hours and neutralization around a neutral point with 12 g of a 10% aqueous solution of sodium carbonate.

The structure of the polyorganosiloxane obtained by the polymerization was confirmed by NMR (JNM-ECA600, determination solvent: $CDCl_3$, determination conditions are same as those in Preparation Example 1). It was confirmed that the polyorganosiloxane was represented by the aforesaid formula (1-1) and had an Mw (weight average molecular weight determined by the aforesaid method) of 400,000. In the aforesaid formula (1-1), $R^2$ is a γ-methacryloxypropyl group and X is a hydroxyl or ethoxy group. The proportions of a, b and d are shown in Table 1. To the aforesaid neutralized reaction mixture (containing 534 g of the polyorganosiloxane obtained above), 61 g of methyl methacrylate (MMA) was added dropwise over a period of 3 to 5 hours under a redox reaction between a peroxide and a reducing agent at 30° C. to proceed acrylic copolymerization with the polyorganosiloxane to obtain a silicone acrylic copolymer resin emulsion having a solid content of 44.8%. The average particle diameter and solid content of the silicone acrylic copolymer resin emulsion are shown in Table 2.

Preparation Example 3

300 Grams of octamethylcyclotetrasiloxane, 300 g of diphenyldimethylsiloxane (KF-54, ex Shin-Etsu Chemical Co., Ltd), 0.96 g of γ-methacryloxypropyl methyldiethoxysilane, a solution obtained by diluting 24 g of 50% sodium alkyl diphenyl ether disulfonate (Pelex SS-L, ex Kao Corporation) with 45 g of pure water, and a solution of 6 g of dodecylbenzene sulfonate in 54 g of pure water were placed in a 2 L-beaker made of polyethylene, and uniformly emulsified by a homomixer, which was then diluted by adding 490 g of water little by little, and passed through a high-pressure homogenizer at a pressure of 300 kgf/cm$^2$ twice to obtain a uniform milky-white emulsion. The emulsion was transferred to a 2 L-glass flask equipped with a stirrer, a thermometer and a reflux condenser, and allowed to polymerize at 55° C. for 10 to 20 hours, followed by aging at 10° C. for 10 to 20 hours and neutralization around a neutral point with 12 g of a 10% aqueous solution of sodium carbonate.

The structure of the polyorganosiloxane obtained by the polymerization was confirmed by NMR (JNM-ECA600, determination solvent: $CDCl_3$, determination conditions are same as those in Preparation Example 1). It was confirmed that the polyorganosiloxane was represented by the following formula (1-2) and had an Mw (weight average molecular weight determined by the aforesaid method) of 8,000.

(1-2)

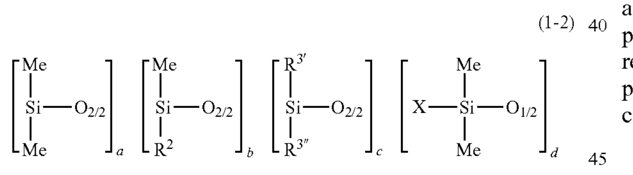

wherein $R^2$ is a γ-methacryloxypropyl group, $R^{3'}$ and $R^{3''}$ are a phenyl or methyl group, at least one of $R^{3'}$ and $R^{3''}$ is a phenyl group, and X is a hydroxyl or ethoxy group and the proportions of a, b, c and d are shown in Table 1.

The emulsion obtained by the aforesaid neutralization had a nonvolatile content (solid content) of 47.5% after drying at 105° C. for 3 hours. To the aforesaid neutralized reaction mixture (containing 534 g of the polyorganosiloxane obtained above), 242 g of methyl methacrylate (MMA) was added dropwise over a period of 3 to 5 hours under a redox reaction between a peroxide and a reducing agent at 30° C. to proceed acrylic copolymerization with the polyorganosiloxane to obtain a silicone acrylic copolymer resin emulsion having a solid content of 45.5%. The average particle diameter and solid content of the silicone acrylic copolymer resin emulsion are shown in Table 2.

Production Example 4

The processes for Production Example 1 above were repeated to obtain a uniform milky-white emulsion. As in Production Example 1, the emulsion was transferred to a 2 L-glass flask equipped with a stirrer, a thermometer and a reflux condenser, and allowed to polymerize at 55° C. for 24 hours, followed by aging at 15° C. for 24 hours and neutralization around a neutral point with 12 g of a 10% aqueous solution of sodium carbonate. The resulting polyorganosiloxane, represented by formula (1-1) above, had an Mw (weight average molecular weight determined by the aforesaid method) of 250,000. To the aforesaid neutralized reaction mixture (containing 534 g of the polyorganosiloxane obtained above), 162 g of methyl methacrylate (MMA) and 80 g of butyl acrylate (BA) were added dropwise over a period of 3 to 5 hours under a redox reaction between a peroxide and a reducing agent at 30° C. to proceed acrylic copolymerization with the polyorganosiloxane to obtain a silicone acrylic copolymer resin emulsion having a solid content of 44.9%. The average particle diameter and solid content of the silicone acrylic copolymer resin emulsion are shown in Table 2.

Comparative Production Example 1

The processes for Production Example 1 above were repeated to obtain a uniform milky-white emulsion. As in Production Example 1, the emulsion was transferred to a 2 L-glass flask equipped with a stirrer, a thermometer and a reflux condenser, and allowed to polymerize at 55° C. for 24 hours, followed by aging at 15° C. for 24 hours and neutralization around a neutral point with 12 g of a 10% aqueous solution of sodium carbonate. The resulting polyorganosiloxane, represented by formula (1-1) above, had an Mw (weight average molecular weight determined by the aforesaid method) of 250,000. To the aforesaid neutralized reaction mixture (containing 534 g of the polyorganosiloxane obtained above), 541 g of methyl methacrylate (MMA) was added dropwise over a period of 3 to 5 hours under a redox reaction between a peroxide and a reducing agent at 30° C. to proceed acrylic copolymerization with the polyorganosiloxane to obtain a silicone acrylic copolymer resin emulsion having a solid content of 45.5%. The average particle diameter and solid content of the silicone acrylic copolymer resin emulsion are shown in Table 2.

Comparative Production Example 2

The processes for Production Example 1 above were repeated to obtain a uniform milky-white emulsion. As in Production Example 1, the emulsion was transferred to a 2 L-glass flask equipped with a stirrer, a thermometer and a reflux condenser, and allowed to polymerize at 55° C. for 24 hours, followed by aging at 15° C. for 24 hours and neutralization around a neutral point with 12 g of a 10% aqueous solution of sodium carbonate. The resulting polyorganosiloxane, represented by formula (1-1) above, had an Mw (weight average molecular weight determined by the aforesaid method) of 250,000. Acrylic polymerization was not performed and the operation was concluded with no further processes. A silicone resin emulsion having a solid content of 44.8% was obtained.

Comparative Production Example 3

552 Grams of octamethylcyclotetrasiloxane, 48 g of γ-methacryloxypropyl methyldiethoxysilane, a solution of 6 g of sodium lauryl sulfate in 54 g of pure water and a solution of 6 g of dodecylbenzene sulfonate in 54 g of pure water were placed in a 2 L-beaker made of polyethylene, and uniformly emulsified by a homomixer, which was then diluted by adding 470 g of water little by little, and passed through a high-pressure homogenizer at a pressure of 300 $kgf/cm^2$ twice to obtain a uniform milky-white emulsion. The emulsion was transferred to a 2 L-glass flask equipped with a stirrer, a thermometer and a reflux condenser, and allowed to polymerize at 55° C. for 24 hours, followed by aging at 15° C. for 24 hours and neutralization around a neutral point with 12 g of a 10% aqueous solution of sodium carbonate.

The structure of the polyorganosiloxane obtained by the polymerization was confirmed by NMR (JNM-ECA600, determination solvent: $CDCl_3$, determination conditions are same as those in Preparation Example 1). It was confirmed that the polyorganosiloxane was represented by the following formula (1-3) and had an Mw (weight average molecular weight determined by the aforesaid method) of 250,000.

(1-3)

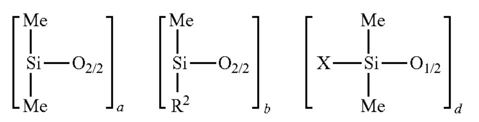

In the aforesaid formula (1-3), $R^2$ is γ-methacryloxypropyl group and X is a hydroxyl or ethoxy group. The proportions of a, b and d are shown in Table 1. To the aforesaid neutralized reaction mixture (containing 534 g of the polyorganosiloxane obtained above), 232 g of methyl methacrylate (MMA) was added dropwise over a period of 3 to 5 hours under a redox reaction between a peroxide and a reducing agent at 30° C. to proceed acrylic copolymerization with the polyorganosiloxane to obtain a silicone acrylic copolymer resin emulsion having a solid content of 45.0%. The average particle diameter and solid content of the silicone acrylic copolymer resin emulsion are shown in Table 2.

TABLE 1

| | Preparation Example | | | | Comparative Preparation Example | | |
|---|---|---|---|---|---|---|---|
| | 1 | 2 | 3 | 4 | 1 | 2 | 3 |
| **Mass proportion of the raw materials for polyorganosiloxane (a1)** | | | | | | | |
| D4 | 100 | 100 | 50 | 100 | 100 | 100 | 100 |
| KF-54 | 0 | 0 | 50 | 0 | 0 | 0 | 0 |
| Sodium lauryl sulfate | 1 | 1 | | 1 | 1 | 1 | 1 |
| Pelex SS-L | | | 2 | | | | |
| Dodecylbenzene sulfonate | 1 | 1 | 1 | 1 | 1 | 1 | 1 |
| γ-Methacryloxypropyl methyldiethoxysilane | 0.08 | 0.1 | 0.16 | 0.08 | 0.08 | 0.08 | 8.7 |
| **Proportions of a to d in polyorganosiloxane (a1), based on a total 100 of a to d** | | | | | | | |
| a | 99.91 | 99.93 | 67.22 | 99.91 | 99.91 | 99.91 | 93.94 |
| b | 0.03 | 0.03 | 0.48 | 0.03 | 0.03 | 0.03 | 6 |
| c | 0 | 0 | 28.5 | 0 | 0 | 0 | 0 |
| d | 0.06 | 0.04 | 3.8 | 0.06 | 0.06 | 0.06 | 0.06 |

D4: octamethyl cyclotetrasiloxane
KF-54: diphenyl dimethyl siloxane
Pelex SS-L: 50% sodium alkyl diphenyl ether disulfonate

TABLE 2

| | Preparation Example | | | | Comparative Preparation Example | | |
|---|---|---|---|---|---|---|---|
| | 1 | 2 | 3 | 4 | 1 | 2 | 3 |
| (a1) Polyorganosiloxane, part by mass | 70 | 90 | 70 | 70 | 50 | 100 | 70 |
| (a2) Methyl methacrylate, part by mass | 30 | 10 | 30 | 20 | 50 | 0 | 30 |
| (a2) Butyl acrylate, part by mass | | | | 10 | | | |
| Tg, ° C. | 110 | 100 | 110 | 30 | 105 | — | 110 |
| Av. particle diameter, nm | 240 | 230 | 240 | 230 | 240 | 210 | 220 |
| Solid content, % | 45.2 | 45.0 | 45.3 | 44.9 | 45.5 | 44.8 | 45.0 |

Examples 1 to 8 and Comparative Examples 1 to 6

The components (A) to (D) and an antifoaming agent were mixed in prescribed amounts shown in the following Tables 3 and 5 and stirred with a propeller stirrer to obtain each ink composition.

[Preparation of Ink]

For example, in Example 1, 1.5 parts of the silicone-acrylic copolymer resin emulsion (solid content: 45%), 13.5 parts of the urethane-based resin emulsion WLS-213 (solid content: 35%), 5 parts of carbon black MA100 (manufactured by MITSUBISHI PAPER MILLS LIMITED), 1.5 parts of NOIGEN XL-400D, 15 parts of glycerol, 12 parts of 1,3-propanediol, 10 parts of diethylene glycol, and 5 parts of propylene glycol were introduced and mixed at 500 rpm. Next, 36.5 parts of water were mixed in and the mixture was stirred with a paint shaker (manufactured by ASADA IRON WORKS. Co., Ltd.) at 1,000 rpm for 60 minutes, then YTZ balls were removed to prepare an ink.

The amounts of the component (C) and the solid contents of the components (A) and (B), with respect to a total of 100 parts by mass of the component (C) and the solid contents of the components (A) and (B), are shown in Tables 4 and 6.

The urethane-based resin emulsions (B) used in the following Examples and Comparative Examples are as follows:

HYDRAN WLS-213 (polycarbonate-based polyurethane dispersion manufactured by DIC Corporation) with a solid content of 35% and a particle diameter of 20 nm to 30 nm;

HYDRAN WLS-201 (polyether-based polyurethane dispersion manufactured by DIC Corporation) with a solid content of 35% and a particle diameter of 20 nm to 30 nm; and ADEKA BONTIGHTER HUX-380 (polyester-based polyurethane dispersion manufactured by ADEKA CORPORATION) with a solid content of 40% and a particle diameter of 0.2 μm.

Pigment (C)

Carbon black MA100 (manufactured by MITSUBISHI PAPER MILLS LIMITED with a particle diameter of 24 nm)

The components (D) used in the following Examples and Comparative Examples are as follows.

Glycerol (SP value: 21.1)

1,3-propanediol (SP value: 13.5)

Diethylene glycol (SP value: 14.6)

Propylene glycol (SP value: 14.8)

[Film Formation Method]

Each of the ink compositions was applied to a PET film with a bar coater such that the thickness of the film after drying was 26 μm and left at room temperature for two days, after which measurement was performed.

Tactile Sensation, Measurement of Coefficients of Static/Dynamic Friction, and Tactile Sensation Using a HEIDON TYPE-38 (manufactured by Shinto Scientific Co., Ltd.), a 200-g metal indenter was brought into vertical contact with the coating film above, a frictional force during the movement of the metal indenter at 3 cm/min was measured, and coefficients of static and dynamic friction were calculated from the frictional force.

For the evaluation of tactile sensation, a case where the coefficient of static friction is less than 0.10, the coefficient of dynamic friction is less than 0.07, and a difference between the coefficient of static friction and the coefficient of dynamic friction is less than 0.05 was evaluated to be Excellent "E".

Dispersibility (Stability over Time)

Each of the ink compositions was left at room temperature for one week, and sedimentation over time was visually determined in accordance with the following criteria.

Excellent "E": no sedimentation occurred.

Good "G": sedimentation occurred, but restirring was possible.

Poor "P": sedimentation occurred, and restoration was impossible.

Application Properties

Each of the ink compositions was applied to a Super film Non-Tack E (manufactured by Okamoto Industries, Inc.) flexible vinyl chloride film with no ink absorbency with a bar coater No. 4 such that the thickness was 9 μm (dried weight in terms of solid content: 3.6 $g/m^2$) and dried at 40° C. for 30 seconds to form an ink layer. The appearance of the ink layer was visually observed and evaluated in accordance with the following criteria.

Excellent "E": no defects was confirmed on the coated surface

Good "G": some appearance defects, such as blobs, was confirmed on the coated surface Poor "P": many appearance defects, such as blobs, was confirmed on the coated surface Adherence Cellulose Tape (registered trademark; manufactured by Nichiban Co., Ltd.) was attached to the ink layer of the coated product obtained in the application properties test above, and then tried to peel the tape at 150 Pa. The adherence was evaluated in accordance with the following criteria.

Excellent "E": no peeling of the ink layer occurred.

Good "G": partial peeling of the ink layer occurred.

Poor "P": complete peeling of the ink layer occurred.

Color Tone

Each of the ink compositions was applied to a sheet of commercially available paper with a bar coater No. 4 such that the thickness was 9 μm (dried weight in terms of solid content: 3.6 $g/m^2$) and dried at 40° C. for 30 seconds to form an ink layer (printed layer). The appearances of the resulting coated paper and the ink layer were visually observed and evaluated in accordance with the following criteria.

Excellent "E": color tone of the resulting coated paper and the ink layer was equal.

Good "G": concentration of black was insufficient.

Poor "P": color tone changed.

Ink Absorbency (Water Resistance)

The paper (printed material) obtained in the color tone test above was set in a Gakushin Color Fastness Rubbing Tester (manufactured by YASUDA SEIKI SEISAKUSHO, LTD.). A test in which the printed surface was rubbed 25 times using a gauze moistened with water was performed. The printed surface and the gauze after rubbing were visually observed and evaluated in accordance with the following criteria.

Excellent "E": no color migration to the gauze occurred.

Good "G": color migration was confirmed.

Poor "P": complete color migration and loss of color on the printed surface were confirmed.

Ink Absorbency (Moisture Resistance)

The paper (printed material) obtained in the color tone test above was left at 50° C. and a humidity of 90% for one day. The printed surface after being left under such conditions was visually observed and evaluated in accordance with the following criteria.

Excellent "E": no bleeding was confirmed in the printed portion.

Good "G": slight bleeding was confirmed in the printed portion.

Poor "P": complete bleeding was confirmed.

TABLE 3

| | | Example | | | | | | | |
|---|---|---|---|---|---|---|---|---|---|
| | Part by mass | 1 | 2 | 3 | 4 | 5 | 6 | 7 | 8 |
| (A) | Preparation 1, Solid content of 45.2% | 1.5 | | | | 1.5 | 1.5 | 3 | 1.5 |

TABLE 3-continued

| Part by mass | | Example 1 | 2 | 3 | 4 | 5 | 6 | 7 | 8 |
|---|---|---|---|---|---|---|---|---|---|
| | Preparation 2, Solid content of 45.0% | | 1.5 | | | | | | |
| | Preparation 3, Solid content of 45.3% | | | 1.5 | | | | | |
| | Preparation 4, Solid content of 44.9% | | | | 1.5 | | | | |
| (B) | Hydran WLS-213 | 13.5 | 13.5 | 13.5 | 13.5 | | | 13.5 | 13.5 |
| | Hydran WLS-201 | | | | | 13.5 | | | |
| | Adekabon titer HUX-380 | | | | | | 13.5 | | |
| (C) | Pigment, BLACK | 5.0 | 5.0 | 5.0 | 5.0 | 5.0 | 5.0 | 5.0 | 10.0 |
| (D) | Glycerin | 15.0 | 15.0 | 15.0 | 15.0 | 15.0 | 15.0 | 15.0 | 15.0 |
| | 1,3-propanediol | 12.0 | 12.0 | 12.0 | 12.0 | 12.0 | 12.0 | 12.0 | 12.0 |
| | Diethylene glycol | 10.0 | 10.0 | 10.0 | 10.0 | 10.0 | 10.0 | 10.0 | 10.0 |
| | Propylene glycol | 5.0 | 5.0 | 5.0 | 5.0 | 5.0 | 5.0 | 5.0 | 5.0 |
| Surfactant | Noigen XL-400D | 1.5 | 1.5 | 1.5 | 1.5 | 1.5 | 1.5 | 1.5 | 1.5 |
| | Water | 36.5 | 36.5 | 36.5 | 36.5 | 36.5 | 36.5 | 35.0 | 31.5 |
| Total, part by mass | | | | | 100 | | | | |
| Solid content, part by mass | | 10% | 10% | 10% | 10% | 10% | 11% | 11% | 15% |
| Evaluation | Tactile Sensation | E | E | E | E | E | E | E | E |
| | Static friction coefficient | 0.05 | 0.04 | 0.07 | 0.08 | 0.04 | 0.06 | 0.04 | 0.05 |
| | Dynamic friction coefficient | 0.02 | 0.02 | 0.04 | 0.05 | 0.02 | 0.03 | 0.02 | 0.03 |
| | Dispersibility | E | E | E | E | E | E | E | E |
| | Coating Ability | E | E | E | E | E | E | E | E |
| | Adhesion | E | E | E | E | E | E | E | E |
| | Color tone | E | E | E | E | E | E | E | E |
| | Ink absorbency, water resistance | E | E | E | E | E | E | E | E |
| | Ink absorbency, humidity resistance | E | E | E | E | E | E | E | E |

TABLE 4

Solid content ratio: a total solid content of components (A) to (C) is 100 parts by mass

| | | Example 1 | 2 | 3 | 4 | 5 | 6 | 7 | 8 |
|---|---|---|---|---|---|---|---|---|---|
| (A) | Preparation 1 | 6.5 | | | | 6.5 | 6.1 | 12.2 | 4.4 |
| | Preparation 2 | | 6.5 | | | | | | |
| | Preparation 3 | | | 6.6 | | | | | |
| | Preparation 4 | | | | 6.5 | | | | |
| (B) | Hydran WLS-213 | 45.4 | 45.4 | 45.4 | 45.4 | | | 42.6 | 30.7 |
| | Hydran WLS-201 | | | | | 45.4 | | | |
| | Adekabon titer HUX-380 | | | | | | 48.7 | | |
| (C) | Pigment, BLACK | 48.1 | 48.1 | 48.0 | 48.1 | 48.1 | 45.1 | 45.1 | 64.9 |

TABLE 5

| Part by mass | | Comparative Example 1 | 2 | 3 | 4 | 5 | 6 |
|---|---|---|---|---|---|---|---|
| (A) | Preparation 1, Solid content of 45.2% | | | | | 22 | 0.1 |
| | Comparative Preparation 1, Solid content of 45.5% | 1.5 | | | | | |
| | Comparative Preparation 2, Solid content of 44.8% | | 1.5 | | | | |
| | Comparative Preparation 3, Solid content of 45.0% | | | 1.5 | | | |
| (B) | Hydran WLS-213 | 13.5 | 13.5 | 13.5 | 15 | 5.0 | 15.3 |
| | Hydran WLS-201 | | | | | | |
| | Adekabon titer HUX-380 | | | | | | |

TABLE 5-continued

| | Part by mass | Comparative Example | | | | | |
|---|---|---|---|---|---|---|---|
| | | 1 | 2 | 3 | 4 | 5 | 6 |
| (C) | Pigment (BLACK) | 5.0 | 5.0 | 5.0 | 5.0 | 5.0 | 5.0 |
| (D) | Glycerin | 15.0 | 15.0 | 15.0 | 15.0 | 15.0 | 15.0 |
| | 1,3-propanediol | 12.0 | 12.0 | 12.0 | 12.0 | 12.0 | 12.0 |
| | Diethylene glycol | 10.0 | 10.0 | 10.0 | 10.0 | 10.0 | 10.0 |
| | Propylene glycol | 5.0 | 5.0 | 5.0 | 5.0 | 5.0 | 5.0 |
| Surfactant | Noigen XL-400D | 1.5 | 1.5 | 1.5 | 1.5 | 1.5 | 1.5 |
| | Water | 36.5 | 36.5 | 36.5 | 36.5 | 46.5 | 36.1 |
| Total, part by mass | | | | 100 | | | |
| Solid content | | 10% | 10% | 10% | 10% | 17% | 10% |
| Evaluation | Tactile Sensation | P | E | P | P | E | P |
| | Static friction coefficient | 0.12 | 0.06 | 0.23 | 0.51 | 0.04 | 0.10 |
| | Dynamic friction coefficient | 0.07 | 0.03 | 0.15 | 0.35 | 0.02 | 0.05 |
| | Coating Ability | G | P | E | E | P | E |
| | Dispersibility | E | P | E | E | P | P |
| | Adhesion | E | P | E | E | P | P |
| | Color tone | E | E | E | E | P | P |
| | Ink absorbency, water resistance | E | E | E | E | E | E |
| | Ink absorbency, humidity resistance | E | E | E | E | E | E |

TABLE 6

| Solid content ratio: a total solid content of components (A) to (C) is 100 parts by mass | | | | | | | |
|---|---|---|---|---|---|---|---|
| | | Comparative Example | | | | | |
| | | 1 | 2 | 3 | 4 | 5 | 6 |
| (A) | Preparation 1 | | | | | 59.5 | 0.4 |
| | Comparative Preparation 1 | 6.6 | | | | | |
| | Comparative Preparation 2 | | 6.5 | | | | |
| | Comparative Preparation 3 | | | 6.5 | | | |
| (B) | Hydran WLS-213 | 45.4 | 45.4 | 45.4 | 51.2 | 10.5 | 51.5 |
| | Hydran WLS-201 | | | | | | |
| | Adekabon titer HUX-380 | | | | | | |
| (C) | Pigment, BLACK | 48.0 | 48.1 | 48.1 | 48.8 | 30.0 | 48.1 |

As shown in Table 5 above, the printed layers obtained from the ink compositions not containing the silicone-acrylic copolymer resin emulsion of the present invention in Comparative Examples 1, 3, and 4 are inferior in terms of tactile sensation, abrasion resistance, and adherence to a substrate. The ink composition in Comparative Example 2 is inferior in terms of dispersibility and application properties, and the obtained printed film is inferior in terms of adherence to a substrate. The ink compositions in Comparative Examples 5 and 6 are inferior in terms of dispersibility, and a printed material that is favorable in every respect in terms of tactile sensation, abrasion resistance, adherence, and chromogenicity is not obtained. In contrast, as shown in Table 3 above, the ink composition of the present invention is excellent in terms of dispersibility, as well as application properties and adherence to a substrate. The obtained printed film is excellent in terms of tactile sensation, abrasion resistance, adherence to a substrate, and durability. The ink composition of the present invention is useful as an aqueous ink composition for inkjet printing.

The invention claimed is:

1. An ink composition comprising the following components (A), (B) and (C), (A) an emulsion of a silicone acrylic copolymer resin in an amount of 0.5 to 20 parts by mass as a solid content, (B) an emulsion of a urethane resin in an amount of 10 to 79.5 parts by mass as a solid content, and (C) pigment in an amount of 20 to 89.5 parts by mass, provided that a total mass of the solid content of components (A) and (B) and component (C) is 100 parts by mass, wherein component (A) is an emulsion of a copolymer of (a1) a polyorganosiloxane represented by the following formula (1) in an amount of 60 to 99 parts by mass with (a2) an acrylic acid ester monomer and/or a methacrylic acid ester monomer in an amount of 1 to 40 parts by mass, provided that a total amount of components (a1) and (a2) is 100 parts by mass, (1)

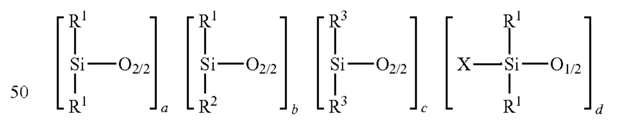

wherein $R^1$ is, independently of each other, a substituted or unsubstituted monovalent hydrocarbon group having 1 to 20 carbon atoms, precluding the groups defined for $R^2$ and a phenyl group; $R^2$ is, independently of each other, an alkenyl group having 2 to 6 carbon atoms or an alkyl group having 1 to 6 carbon atoms and of which a part of the hydrogen atoms bonded to the carbon atom is substituted with a mercapto group, a vinyl group, an acryloxy group, or a methacryloxy group; $R^3$ is, independently of each other, a phenyl group or the group defined for $R^1$, and at least one of $R^3$s bonded to the silicon atom is a phenyl group; and X is, independently of each other, a substituted or unsubstituted monovalent hydrocarbon group having 1 to 20 carbon atoms, an alkoxy group having 1 to 20 carbon atoms, or a hydroxyl group; and a, b, c and d are the number satisfying equations: $0.11 \le a/(a+b+c+d) < 1$, $0.00001 \le b/(a+b+c+d) \le 0.05$, $0 \le c/(a+b+c+d) \le 0.6$, and $0.000001 \le d/(a+b+c+d) \le 0.24$, based on the total number of a, b, c and d.

2. The ink composition according to claim 1, wherein component (B) is an emulsion of at least one resin selected from polyether polyurethane resins, polyester polyurethane resins and polycarbonate polyurethane resins.

3. The ink composition according to claim 1, wherein (A) the emulsion of the silicone acrylic copolymer resin has an average primary particle diameter of emulsion particles is 1,000 nm or less.

4. The ink composition according to claim 1, wherein (C) the pigment has an average particle diameter of 5 nm to 10 μm.

5. The ink composition according to claim 1, wherein the amount of component (A) is 0.1 to 20% by mass in the ink composition, the amount of component (B) is 3 to 70% by mass in the ink composition, and the amount of component (C) is 0.1 to 25% by mass in the ink composition.

6. The ink composition according to claim 1, further comprising (D) a water-soluble organic solvent in an amount of 3 to 70% by mass, based on the total amount of the ink composition.

7. The ink composition according to claim 6, wherein component (D) is an organic solvent having a solubility parameter (SP value) of 10 or more and 3 or more carbon atoms.

8. The ink composition according to claim 1, comprising water in an amount of 10% by mass or more, based on the total amount of the ink composition.

9. The ink composition according to claim 2, wherein (A) the emulsion of the silicone acrylic copolymer resin has an average primary particle diameter of emulsion particles is 1,000 nm or less.

10. The ink composition according to claim 2, wherein (C) the pigment has an average particle diameter of 5 nm to 10 μm.

11. An ink composition comprising the following components (A'), (B') and (C) and water, (A') a silicone acrylic copolymer resin in an amount of 0.1 to 20 parts by mass % in the ink composition, (B') at least one resin selected from polyether polyurethane resins, polyester polyurethane resins and polycarbonate polyurethane resins, in an amount of 3 to 70 parts by mass % in the ink composition, and (C) pigment in an amount of 0.1 to 25 parts by mass % in the ink composition, wherein component (A') is a copolymer of (a1) a polyorganosiloxane represented by the following formula (1) in an amount of 60 to 99 parts by mass with (a2) an acrylic acid ester monomer and/or a methacrylic acid ester monomer in an amount of 1 to 40 parts by mass, provided that a total amount of components (a1) and (a2) is 100 parts by mass, (1)

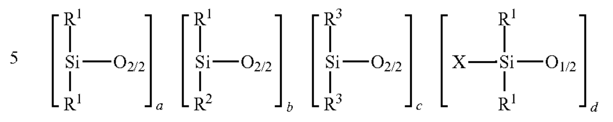

wherein $R^1$ is, independently of each other, a substituted or unsubstituted monovalent hydrocarbon group having 1 to 20 carbon atoms, precluding the groups defined for $R^2$ and a phenyl group; $R^2$ is, independently of each other, an alkenyl group having 2 to 6 carbon atoms or an alkyl group having 1 to 6 carbon atoms and of which a part of the hydrogen atoms bonded to the carbon atom is substituted with a mercapto group, a vinyl group, an acryloxy group, or a methacryloxy group; $R^3$ is, independently of each other, a phenyl group or the group defined for $R^1$, and at least one of $R^3$s bonded to the silicon atom is a phenyl group; and X is, independently of each other, a substituted or unsubstituted monovalent hydrocarbon group having 1 to 20 carbon atoms, an alkoxy group having 1 to 20 carbon atoms, or a hydroxyl group; and a, b, c and d are the number satisfying equations:

$0.11 \le a/(a+b+c+d) < 1$, $0.00001 \le b/(a+b+c+d) \le 0.05$, $0 \le c/(a+b+c+d) \le 0.6$, and $0.000001 \le d/(a+b+c+d) \le 0.24$, based on the total number of a, b, c and d.

12. The ink composition according to claim 11, further comprising (D) a water-soluble organic solvent in an amount of 3 to 70% by mass, based on the total amount of the ink composition.

13. The ink composition according to claim 12, wherein component (D) is an organic solvent having a solubility parameter (SP value) of 10 or more and 3 or more carbon atoms.

14. The ink composition according to claim 1, wherein a difference between a coefficient of static friction and a coefficient of dynamic friction of a coating film which is obtained from the ink composition is less than 0.05.

15. An ink for inkjet printing, comprising the ink composition according to claim 1.

16. A printed material having a recording medium and the ink composition according to claim 1 that is attached to the recording medium.

17. The printed material according to claim 16, wherein the recording medium has low or no ink absorbency.

18. A method for preparing a printed material, the method comprising a step of discharging the ink composition according to claim 1 from an inkjet head onto a recording medium and making the ink composition attach to the recording medium to obtain the printed material.

19. A method for inkjet recording, comprising a step of discharging the ink composition according to claim 1 from an inkjet head and making the ink composition attach to a recording medium to conduct printing.

20. The method according to claim 19, wherein the recording medium has low or no ink absorbency.

* * * * *